United States Patent
Du et al.

(10) Patent No.: US 11,692,923 B2
(45) Date of Patent: Jul. 4, 2023

(54) STANDARD SAMPLE FOR MEASURING ROCK POROSITY BY HELIUM METHOD

(71) Applicant: Sichuan Keyuan Testing Center of Engineering Technology Co., Ltd, Chengdu (CN)

(72) Inventors: Hongyu Du, Chengdu (CN); Jianqiao Weng, Chengdu (CN); Minghui Qi, Chengdu (CN); Qian Cao, Chengdu (CN); Hu Liu, Chengdu (CN); Yeyu Zhang, Chengdu (CN); Qiang Xu, Chengdu (CN)

( * ) Notice: Subject to any disclaimer, the term of this patent is extended or adjusted under 35 U.S.C. 154(b) by 0 days.

(21) Appl. No.: 17/885,495

(22) Filed: Aug. 10, 2022

(65) Prior Publication Data
US 2023/0051513 A1    Feb. 16, 2023

(30) Foreign Application Priority Data
Aug. 13, 2021    (CN) .......................... 202110934012.1

(51) Int. Cl.
    *G01N 15/08*    (2006.01)
(52) U.S. Cl.
    CPC ....... *G01N 15/088* (2013.01); *G01N 15/0806* (2013.01); *G01N 2015/0813* (2013.01)
(58) Field of Classification Search
    CPC .... G01N 15/00; G01N 15/08; G01N 15/0806; G01N 15/088; G01N 1/00; G01N 1/36; G01N 2015/0813
    See application file for complete search history.

(56) References Cited

U.S. PATENT DOCUMENTS 9,091,622 B2 *   7/2015   Sinha ................. G01N 15/0826

FOREIGN PATENT DOCUMENTS

| CN | 106769751 A | * | 5/2017 | ............... G01N 1/36 |
| CN | 106769751 A |   | 5/2017 | |
| CN | 111024586 A | * | 4/2020 | ............. G01N 15/08 |

* cited by examiner

*Primary Examiner* — Nguyen Q. Ha

(57) ABSTRACT

A standard sample for measuring rock porosity by helium method is disclosed, which includes a cylinder body open above and a cover body matching the cylinder body. The center of the cover body is provided with a vent hole. The cylinder body is filled and tamped with filled sand body so that theoretical porosity in the cylinder body is 5%-10%. The filled sand body includes mixed sand body and quartz cotton. The mixed sand body includes coarse-grained high-purity quartz sand, medium-grained high-purity quartz sand and fine-grained silicon micropowder. By mixing, filling and tamping high-purity quartz sand with different particle sizes, silicon micropowder and quartz cotton, the porosity and permeability of the standard sample are reduced, so that the standard sample is closer to the physical properties of the actual shale geological samples to verify the method or calibrate the instrument for measuring rock porosity with helium method.

4 Claims, 1 Drawing Sheet

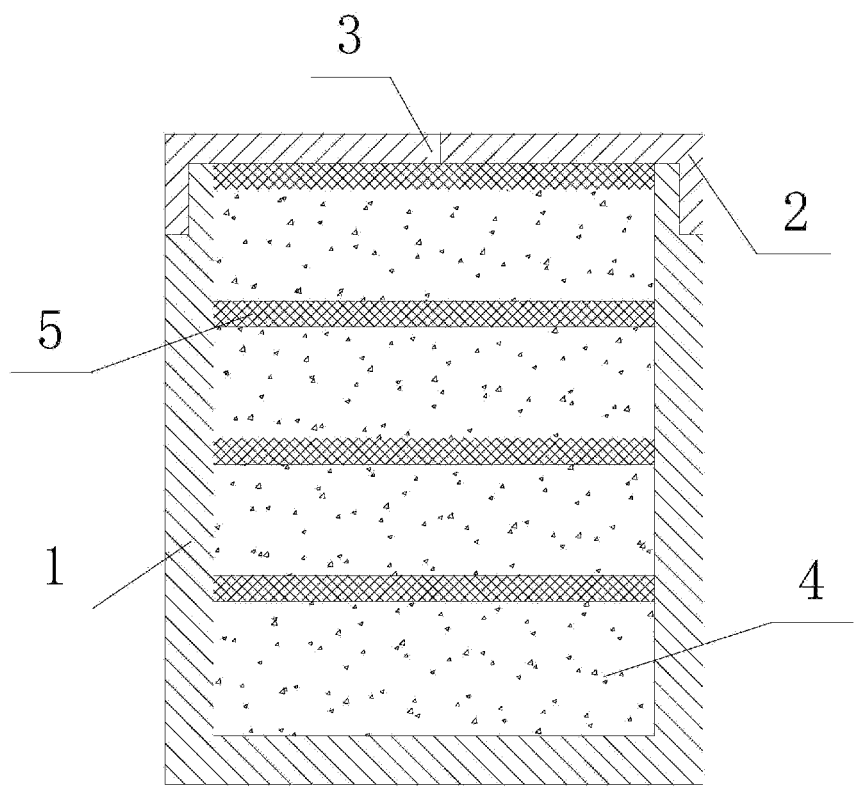

STANDARD SAMPLE FOR MEASURING ROCK POROSITY BY HELIUM METHOD

CROSS REFERENCE TO RELATED APPLICATION

This patent application claims the benefit and priority of Chinese Patent Application No. 202110934012.1 filed on Aug. 13, 2021, the disclosure of which is incorporated by reference herein in its entirety as part of the present application.

TECHNICAL FIELD

The present disclosure relates to the technical field of auxiliary equipment for rock porosity measurement, and more specifically, to a standard sample for measuring rock porosity by helium method.

BACKGROUND ART

Rock porosity is the core key parameter index for oil and gas reservoir evaluation and reserve calculation. At present, there are many methods for rock porosity measurement, such as gas measurement, liquid measurement, nuclear magnetic resonance and so on. At the same time, different measuring instruments and equipment are developed according to their corresponding methods and principles. These methods and corresponding equipment also have their own applicable conditions and limitations. Shale gas reservoirs are generally characterized by low porosity and extremely low permeability, so it is difficult to accurately measure their porosity. The reality shows that the consistency of measuring results of different methods and different equipment is not ideal, and the reasons are various. The lack of economically applicable standard samples is one of the main reasons. The National Standard of the People's Republic of China of Measurement of helium porosity and pulse decay permeability of shale (GB/T34533-2017) stipulates the basic principles and technical requirements of shale reservoir helium porosity measurement and equipment, but the actual measuring results are still uncertain due to different equipment and conditions. Therefore, there is an urgent need for a standard sample to verify the measuring method or quickly calibrate the measuring instruments, so as to improve the accuracy of porosity measurement. At present, the applicable rock porosity standard samples under the condition of low porosity and low permeability in China are relatively rare, while the price of rock porosity standard samples under the condition of low porosity and low permeability in foreign countries is too high, resulting in a greatly increased measuring cost. Therefore, aiming at the method of measuring rock porosity with helium method, a standard sample to verify the instrument or method of measuring porosity by helium method is proposed.

SUMMARY

The technical problem to be solved by the disclosure is to provide a standard sample for measuring rock porosity by helium method, which has simple structure, simple manufacturing process and low manufacturing cost, and can be effectively used for method verification or instrument calibration of rock porosity measuring by helium method.

The technical scheme adopted by the disclosure is as follows. A standard sample for measuring rock porosity by helium method includes cylinder body open above and a cover body matching the cylinder body. The center of the cover body is provided with a vent hole. The cylinder body is filled and tamped with filled sand body so that a theoretical value of porosity in the cylinder body is 5%-10%, and the filled sand body includes the mixed sand body and quartz cotton. The mixed sand body includes coarse-grained high-purity quartz sand, medium-grained high-purity quartz sand and fine-grained silicon micropowder.

Preferably, in the filled sand body, according to the mass ratio, 60%-70% of the filled sand body is the coarse-grained high-purity quartz sand, 10%-20% of the filled sand body is the medium-grained high-purity quartz sand, 5%-10% of the filled sand body is the fine-grained silicon micropowder, and 1%-10% of the filled sand body is the quartz cotton.

Preferably, a particle size of the coarse-grained high-purity quartz sand is controlled at 20-40 meshes, a particle size of the medium-grained high-purity quartz sand is controlled at 200-300 meshes, and a particle size of the fine-grained silicon micropowder is controlled at 2000-3000 meshes.

Preferably, the mixed sand body and the quartz cotton in the cylinder body are alternately arranged and tamped layer by layer.

Preferably, the cover body is sealed at the opening of the cylinder body by a thermal packaging process.

The disclosure has simple structure, simple manufacturing process and low manufacturing cost. By mixing, filling and tamping high-purity quartz sand with different particle sizes, silicon micropowder and quartz cotton, the porosity and permeability of the standard sample are fully reduced, so that the physical properties of the standard sample is closer to the physical properties of the actual shale geological samples, so as to verify the method or calibrate the instrument for measuring rock porosity with helium method.

BRIEF DESCRIPTION OF THE DRAWINGS

FIG. 1 is a structural diagram of the disclosure.
In the FIG. 1: 1. Cylinder body; 2. Cover body; 3. Vent hole; 4. Mixed sand body; 5. Quartz cotton.

DETAILED DESCRIPTION OF THE EMBODIMENTS

The disclosure will be further described in detail below in combination with the accompanying drawings and specific embodiments.

Embodiment 1

As shown in FIG. 1, a standard sample for measuring rock porosity by helium method provided by this embodiment is prepared according to the following steps.

S1: Stainless steel is used to process the cylindrical cylinder body 1 open above. The top of the cylinder body 1 is provided with an annular step along the outer edge of its circumference. In this embodiment, the cylinder body 1 has an outer diameter of 25 mm, an inner diameter of 19 mm, an outer height of 29 mm, an inner depth of 28 mm, and a step height of 3 mm. The surfaces of the inner wall of cylinder body 1, the outer wall of cylinder body 1 and the step of cylinder body 1 are uniform and smooth.

S2: The cover body 2 is made of metal material with large coefficient of thermal expansion. Brass is used in this embodiment. The prepared cover body 2 is matched with the top step of the cylinder body 1, and a vent hole 3 is processed in the center of the prepared cover body 2. In this embodiment, the prepared cover body 2 has an outer diameter of 25 mm, an outer height of 4 mm, an inner depth of 3 mm, and an aperture of the vent hole of 0.5 mm.

S3: The vernier caliper is used for accurate measurement, and the external volume $V_0$ and internal volume $V_1$ of the cylinder body 1 can be calculated according to the measured geometric size of the cylinder body 1.

S4: According to the mass ratio, 65% of the filled sand body is selected as the coarse-grained high-purity quartz sand with particle size of 20-40 meshes, 20% of the filled sand body is selected as the medium-grained high-purity quartz sand with particle size of 200-300 meshes, 10% of the filled sand body is selected as the fine-grained silicon micropowder with particle size of 2000-3000 meshes, and 5% of the filled sand body is selected as the quartz cotton 5. The selected coarse-grained high-purity quartz sand, medium-grained high-purity quartz sand, fine-grained silicon micropowder and quartz cotton are weighed respectively, that is, the mass of each filler is obtained.

S5: The selected coarse-grained high-purity quartz sand, medium-grained high-purity quartz sand and fine-grained silicon micropowder are filled and tamped in the cylinder body 1, and the top surface of mixed sand body 4 is covered with the quartz cotton 5 after filling and tamping. After the quartz cotton 5 covering, the cover body 2 is heated to 200-250° C., and the cover body 2 is sealed at the opening of the cylinder body 1 by the thermal expansion process to ensure that the cover body 2 is tightly sealed at the opening of the cylinder body 1, and the invalid volume is eliminated to the greatest extent. After sealing the cover body 2, the mixed sand body 4 and quartz cotton 5 in the cylinder body 1 are in a tamped state.

S6: According to the known density and weighed mass of each filler of coarse-grained high-purity quartz sand, medium-grained high-purity quartz sand, fine-grained silicon micropowder and quartz cotton, the overall skeleton volume $V_2$ of the filled sand body in cylinder body 1 can be calculated, so that the theoretical porosity value of the standard sample can be calculated and determined by the following formula:

$$\phi=[V_1-V_2]/V_0 \times 100\%$$

According to the theoretical value of the porosity of the standard sample, the porosity of the standard sample is measured by helium method. According to the measured value of porosity and the calculated theoretical value of porosity, the measuring instrument is calibrated. At the same time, the corresponding measuring methods can also be verified. The standard sample of the present disclosure is only an instrument and method verification for measuring rock porosity by helium method. The vent hole 3 on the cover body 2 of the disclosure is used to connect with the channel connected with the gas in the sample chamber space of the helium method porosity measuring instrument.

Further, in order to ensure the accuracy of the theoretical value of the porosity of the standard sample, it is necessary to dry the coarse-grained high-purity quartz sand, medium-grained high-purity quartz sand, fine-grained silicon micropowder and quartz cotton 5 at a temperature of 60-80° C. before filling.

Furthermore, in order to avoid the deviation of porosity value caused by moisture in a wet environment, the filling process should be operated in a dry environment, the prepared standard sample should be stored in a dry environment, and the moisture should be dried regularly in an oven at 60-80° C., so as to ensure the accuracy of verification of the standard sample.

Embodiment 2

The embodiment 2 is basically the same as embodiment 1, except that the filling method and the inner wall of the cylinder body 1 are different. The mixed sand body 4 and quartz cotton 5 are filled in the cylinder body 1 layer by layer, that is, a layer of the mixed sand body 4 is filled first, then a layer of quartz cotton 5 is laid after the mixed sand body 4 is tamped. Thus, filling and tamping are performed in turn, and the quartz cotton 5 is still on the top of the filled sand body, which can prevent the mixed sand body 4 from leaking out from the vent hole 3. The inner wall of the cylinder body 1 is evenly distributed with multiple rings of annular fine protrusions from top to bottom, which is similar to machining fine threads on the inner wall of the cylinder body 1, which can effectively reduce the permeability of the standard sample after filling. At this time, the measurement of the inner volume of the cylinder 1 can be obtained by the weighing method, that is, the mass of the cylinder body 1 filled with pure water is subtracted from the mass of the empty cylinder body.

The above is only the preferred embodiments of the disclosure, but the protection scope of the disclosure is not limited to this. Any modification and replacement based on the technical scheme and inventive concept provided by the disclosure should be covered by the protection scope of the disclosure.

What is claimed is:

1. A standard sample for measuring rock porosity by helium method, comprising a cylinder body (1) open above and a cover body (2) matching the cylinder body (1), wherein a center of the cover body (2) is provided with a vent hole (3); the cylinder body (1) is filled and tamped with filled sand body so that a theoretical value of porosity in the cylinder body (1) is 5%-10%, and the filled sand body comprises mixed sand body (4) and quartz cotton (5); the mixed sand body (4) comprises coarse-grained high-purity quartz sand, medium-grained high-purity quartz sand and fine-grained silicon micropowder; and the cover body (2) is sealed at the opening of the cylinder body (1) by a thermal packaging process after the filling and tamping.

2. The standard sample for measuring rock porosity by helium method of claim 1, wherein in the filled sand body, according to a mass ratio, 60%-70% of the filled sand body is the coarse-grained high-purity quartz sand, 10%-20% of the filled sand body is the medium-grained high-purity quartz sand, 5%-10% of the filled sand body is the fine-grained silicon micropowder, and 1%-10% of the filled sand body is the quartz cotton.

3. The standard sample for measuring rock porosity by helium method of claim 2, wherein a particle size of the coarse-grained high-purity quartz sand is controlled at 20-40 meshes, a particle size of the medium-grained high-purity quartz sand is controlled at 200-300 meshes, and a particle size of the fine-grained silicon micropowder is controlled at 2000-3000 meshes.

4. The standard sample for measuring rock porosity by helium method of claim 1, wherein the mixed sand body (4) and the quartz cotton (5) in the cylinder body (1) are alternately arranged and tamped layer by layer.

* * * * *